Feb. 19, 1963 J. BAXTER, JR Re. 25,333

PAPER MACHINERY

Original Filed Oct. 13, 1958 4 Sheets-Sheet 1

INVENTOR.
JOSEPH BAXTER, JR.

BY

Marshall, Bibel, Finch & Bugg

ATTORNEYS

PAPER MACHINERY

Original Filed Oct. 13, 1958 4 Sheets-Sheet 2

INVENTOR.
JOSEPH BAXTER, JR.
BY
Marischal, Biebel, Bunch & Begg
ATTORNEYS

PAPER MACHINERY

Original Filed Oct. 13, 1958 4 Sheets-Sheet 3

INVENTOR.
JOSEPH BAXTER, JR.

BY

Marshall, Bibel, French & Bugg
ATTORNEYS

Feb. 19, 1963 J. BAXTER, JR Re. 25,333

PAPER MACHINERY

Original Filed Oct. 13, 1958 4 Sheets-Sheet 4

INVENTOR.
JOSEPH BAXTER, JR.

BY

Marshall, Bichel, French & Bugg

ATTORNEYS

United States Patent Office

Re. 25,333
Reissued Feb. 19, 1963

25,333
PAPER MACHINERY

Joseph Baxter, Jr., Franklin, Ohio, assignor to The Black-Clawson Company, Hamilton, Ohio, a corporation of Ohio Original No. 2,969,114, dated Jan. 24, 1961, Ser. No. 767,008, Oct. 13, 1958. Application for reissue Feb. 23, 1962, Ser. No. 175,380
29 Claims. (Cl. 162—348)

Matter enclosed in heavy brackets [ ] appears in the original patent but forms no part of this reissue specification; matter printed in italics indicates the additions made by reissue.

This invention relates to paper making machines.

The invention in general relates to paper making machines of the type in which a traveling forming web is employed in the formation of a paper sheet, but it offers substantial advantages in structure, mode of operation and results over existing Fourdrinier machines. The primary objective of the invention, however may be more broadly stated as being to provide a paper machine which is capable of producing a continuous sheet of paper of practically matching physical characteristics on both sides thereof, which will produce such a paper sheet wherein the long and short fibers are distributed in such manner as to assure high speeds of operation when the sheet is subsequently used on a printing press while requiring minimum amounts of surface coating consistent with the desired quality of printing, and which is itself capable of operation at desired high production speeds.

A particular object of the invention is to provide a paper machine which will operate as outlined above to produce a paper sheet wherein the several constituent materials are distributed within the sheet in desired strata relative to the surfaces of the sheet, and specifically to produce a paper sheet having maximum concentration of long fibers in a central layer of the sheet and maximum concentration of filler materials and other small particles along both surfaces of the sheet for desired smoothness and freedom from two-sidedness.

A further object of the invention is to provide a paper machine of such structure and mode of operation that substantially no air passes through the sheet while it is being formed, thereby reducing the tendency for the formation of craters in the surface of the sheet, and consequently the amount of supplementary coating required to produce a smooth surface, as well as affording economies of construction and operation by reason of the reduction in the requirement for vacuum pumps or like equipment.

An additional object is to provide a paper machine which substantially eliminates the entrainment of air with the stock in the forming zone, and which therefore correspondingly eliminates defects such as pin holes in the sheet caused on conventional paper machines by the escape of entrained air from within the sheet after the sheet has begun to form.

Still another object of the invention is to provide a paper machine which does not require any table rolls such as are used on conventional Fourdrinier machines to support the forming wire after it leaves the initial forming zone, and which therefore in operation is free of the undesirable effects of such table rolls in tending to pump water upwardly into the lower surface of the sheet on the upwardly moving side of the roll followed by immediate withdrawal on the downwardly turning side of the roll with the resulting tendency to wash the fine suspensoids out of the sheet.

It is also an object of the invention to provide a paper machine of such structure and mode of operation that the stock can be screened substantially immediately ahead of its delivery to the forming zone with no time lag or velocity change permitting flocculation to take place.

A further object of the invention is to provide a paper machine wherein the initial orifice of the forming zone may be precisely ground and does not require individual adjustments across the width of the machine to correct erratic currents, and particularly to provide such a paper machine wherein the initial forming orifice is defined by a pair of moving walls in such manner that the effects of skin friction present with the conventional machines are practically non-existent.

Another important object of the invention is to achieve some or all of the above results while at the same time providing a paper machine which requires greatly reduced floor space in comparison with existing machines of conventional construction without sacrificing quality, speed of operation, or convenience of maintenance.

In accordance with the invention, all these and many other objects and advantages can be achieved by the provision of a paper machine of novel structure and operating characteristics wherein the paper sheet is formed while traveling vertically between a pair of foraminous forming webs under such conditions that controlled drainage of liquid takes place simultaneously from both surfaces of the sheet at substantially the same rates. Thus in a preferred embodiment of the invention, the two forming webs travel downwardly through a forming nip defined by a pair of breast rolls mounted in spaced relation in a common horizontal plane, and the stock is delivered directly downwardly into this nip from a headbox of special construction which provides effective screening of the stock just ahead of its delivery to the forming nip. A plurality of pairs of suction rolls are arranged in vertically spaced relation below these breast rolls to support the forming webs over the remainder of the distances through which they travel while the sheet is being formed, and these pairs of rolls are progressively more closely spaced to cause the stock to be comparted between the forming webs. Special provision is also made by the invention for effecting controlled drainage of liquid through the successive pairs of suction rolls, and the sheet is conducted away after it reaches the nip of the lowermost pair of suction rolls, which thus also function as couch rolls.

It is an object of the invention to provide a paper machine having the general structural arrangement and mode of operation outlined in the preceding paragraph and which is especially characterized also by its minimum requirements of space in comparison with the length of the forming webs and the speed of the machine.

An additional object of the invention is to provide a paper machine as outlined above wherein the sheet while it is being formed passes between successive pairs of suction zones which effect the opposite sides of the sheet simultaneously and which are subject to individual control such that the degree of suction and the corresponding drainage from the sheet may very in accordance with its desired final characteristics. Thus such control can be achieved in a paper machine of the specific structural arrangement outlined above by individual control of the suction and drainage through each successive horizontally arranged pair of suction rolls.

A further object of the invention is to provide a paper machine of the general structural arrangement outlined above wherein the several breast rolls and suction rolls for supporting the forming webs are mounted in frames which include upright columns at each end of the rolls, and wherein one of these columns for each vertical set of rolls is mounted for rotational movement on a vertical axis to support the other column and associated rolls in cantilevered position for changing the forming webs.

An additional object of the invention is to provide a paper machine as outlined above wherein each of the several suction rolls is mounted in the machine by a pair of end castings which constitute component parts of the frame columns respectively and cooperate with one or more individual connecting members to form a modular unit such that additional pairs of such units and rolls can be added to the machine for the purpose of lengthening the effective paths of the forming webs, and thereby increasing the speed of operation of the machine, without increasing the floor space required by the machine.

A further object of the invention is to provide a paper machine as outlined above wherein the end castings in one frame column for each vertical set of rolls are connected with the main source of suction for the machine, each casting in the other frame column includes valve means for regulating the suction and drainage through the associated suction roll, and the connecting members between the complementary pairs of castings are hollow for drainage therethrough from one column to the other.

Still another object of the invention is to provide a paper machine having some or all of the features outlined above wherein one or more deflector plates may be mounted above each suction roll in close proximity to the associated forming web for the purpose of deflecting freely flowing liquid onto the surface of the roll ahead of its area of contact with the forming web in such manner that such liquid may be immediately removed to the interior of the roll rather than tending to form a puddle in the nip of the roll with its horizontally associated suction roll on the opposite side of the sheet.

It is a further object of the invention to provide a paper machine offering the features and advantages outlined above wherein the forming zone is effectively sealed from the outside atmosphere, and in fact may be continuously under controlled suction, in such manner as to minimize the possibility of leakage of liquid in the vicinity of the machine.

Many further objects and advantages of the invention will be apparent from the following description, the accompanying drawings and the appended claims.

Figure 1:
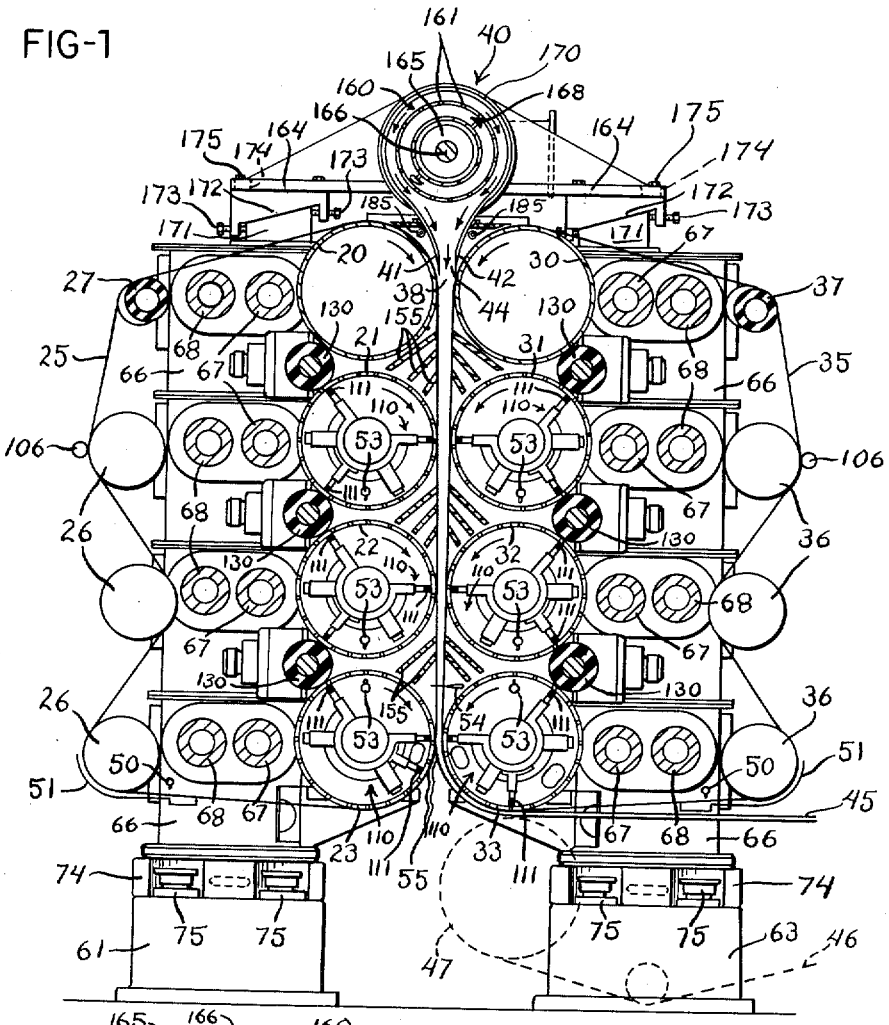
FIG. 1 is a view in vertical section illustrating the general construction and mode of operation of a paper machine in accordance with the invention, the view being taken as indicated by the line 1—1 of FIG. 3.

Referring to the drawings, which illustrate a preferred embodiment of the invention, the machine includes two sections which are substantially identical with each other and each of which constitutes approximately one-half of the forming portion of the machine. More specifically, one side of the machine includes a breast roll 20 and three suction rolls 21, 22 and 23 which are mounted in generally vertically aligned relation below the breast roll 20 and cooperate therewith and with suitable guide rolls 26 and a squaring roll 27 to support a forming web 25 of suitable foraminous structure, such as a conventional forming wire or a woven fabric or felt web. The other side of the machine includes an identical arrangement of breast roll 30, suction rolls 31, 32 and 33, forming web 35, guide rolls 36 and squaring roll 37. These two sections of the machine are arranged in relatively closely spaced relation such that their respective breast rolls define a vertically extending nip 38 therebetween, and the two forming webs are thus supported for downward travel through and below this nip.

A single headbox 40 is mounted on top of the machine and includes a pair of depending lips 41 and 42 defining a downwardly extending discharge passage 44 for delivering stock to the nip 38 of the breast rolls 20 and 30 for continued downward travel between the forming webs 25 and 35. The liquid in this stream of stock is progressively withdrawn through the forming webs by means of the successive suction rolls to form a continuous fiber sheet 45, and since the thickness of this sheet is progressively decreased as the liquid is withdrawn, the successive pairs of suction rolls are located in progressively more closely spaced relation to cause corresponding narrowing of the gap between the forming webs.

The lowermost pair of suction rolls 23—33 act as couch rolls, and the sheet 45 which emerges from their nip is conveyed to the next section of the paper machine by a felt 46 and transfer roll 47, which may be conveniently mounted as indicated in FIG. 1 below either of the lowermost suction rolls, shown as the roll 33. The return flights of the two forming webs are shown as cleaned by suitable showers 50 in combination with drip pans 51 to receive the wash water through the forming webs, and similar showers 53 may be employed to effect continuous cleaning of each of the suction rolls. FIG. 1 also shows one of the jet nozzles 54 for trimming the edge of the sheet 45 before the latter reaches the nip of the suction rolls 23 and 33, and the resulting trim strips 55 are readily separated from the sheet 45 by suitable arrangement of conventional deckles (not shown) within the rolls 23 and 33.

Figure 3:
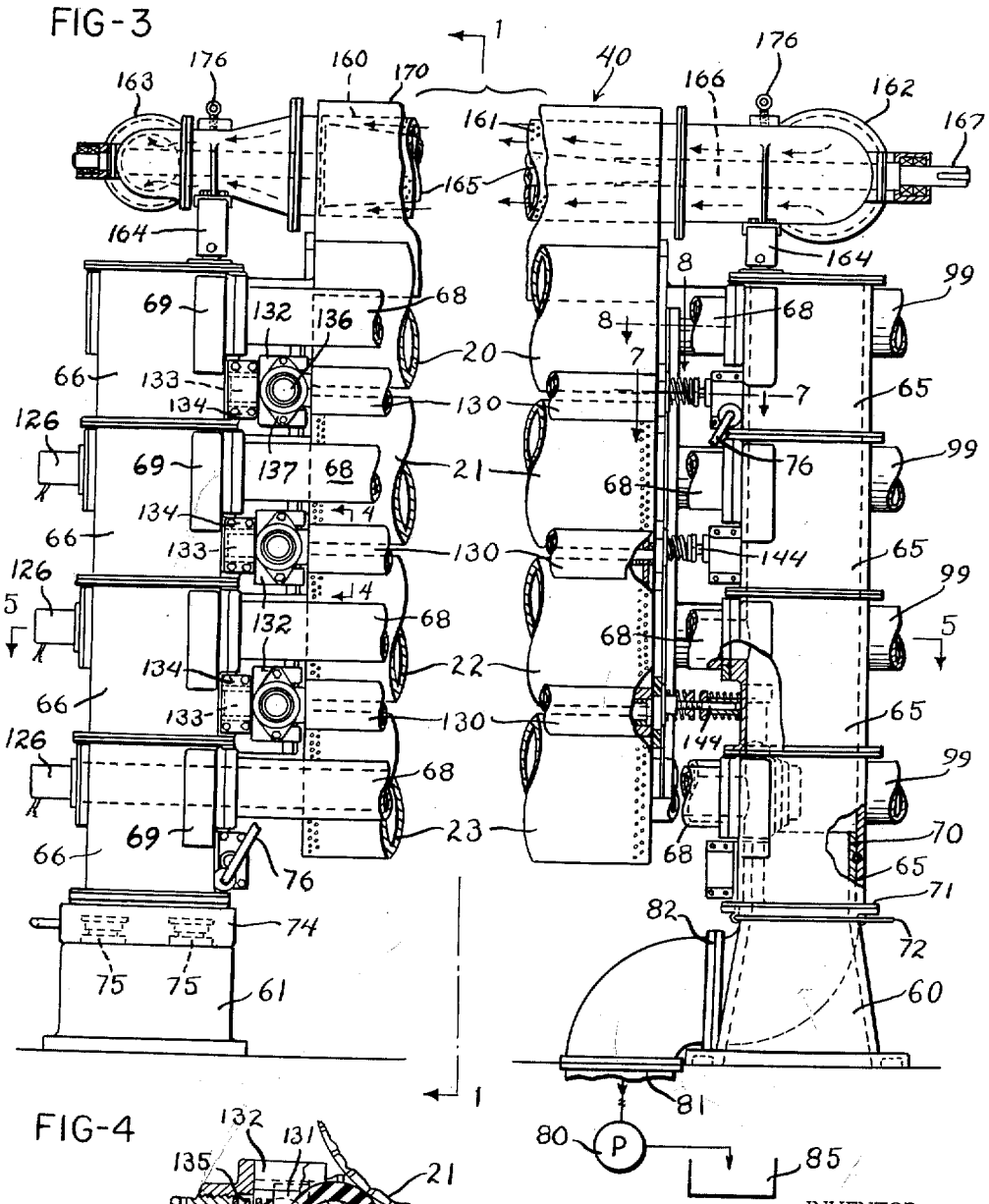
FIG. 3 is an elevational view of the paper machine of FIG. 1, looking from left to right in FIG. 1 with some parts removed.

Considering now the general structure of one of the two sections of the machine, and referring particularly to FIG. 3, there is a pair of pedestals 60 and 61 located at opposite sides of the machine, the pedestal 60 being located at the drive side and the pedestal 61 at the tending side, and there is a similar pair of pedestals 62 and 63 for the other section of the rolls. The several rolls 20–23 are each supported at opposite ends by identical pairs of castings 65 and 66 stacked on the pedestals 60 and 61 respectively. A pair of cross tubes 67 and 68 form a rigid connection between each pair of castings 65 and 66 to complete this portion of the machine frame, and identical sets of castings 65—66 and cross tubes 67—68 support each of rolls 30—33. Each of the castings 65—66 is also shown as incorporating a boss or pad 69 which can serve as a mounting for a bearing for one of the guide or squaring rolls shown in FIG. 1.

Provision is made in accordance with the invention for pivotal movement of each section of rolls on its pedestal 60 or 62 to support the several rolls and their associated castings 66 in cantilevered position for changing the forming web thereon. Referring to FIG. 3, the pedestal 60 is provided on its upper end with a short cylindrical tube 70 on which the lowermost casting 65 is mounted for pivotal movement, and the upper surface portion 71 of the pedestal 60 accordingly forms a bearing surface for this casting 65. An inlet tube 72 for lubricant is arranged to supply grease to this bearing surface 71, as by means of a conventional grease gun, to float the castings 65 sufficiently for free turning movement.

The other pedestal 61 cooperates with a removable block 74 to support the lowermost casting 66 during normal operation of the machine. In addition, the pedestal 61 incorporates one or more fluid pressure cylinders having pistons 75 which in their normal retracted positions lie out of contact with the lower surface of the adjacent casting 66. When the forming web 25 is to be changed, it is merely necessary to operate these cylinders so that their pistons 75 raise the castings 66 sufficiently for removal of the block 74, after which the pistons 75 are again retracted, and the entire section can be swung sufficiently on the pedestal 60 for removal and replacement of the web 25. The same procedure applies for changing the web 35, in which case the roll section is similarly cantilevered on the pedestal 62. Additional support may be provided, particularly during wire changing by a diagonal brace 76 extending from the lowermost casting 66 to the uppermost casting 65 as indicated in FIG. 3.

In addition to supporting the several suction rolls, the castings 65—66 and cross tubes 67—68 also form portions of the system for removing water from the sheet 45 by way of the suction rolls. More specifically, the interior of the pedestal 60 is connected as indicated in FIG. 3 to a suitable source 80 of suction, which for example may be a vacuum pump or a centrifugal pump, and the line 81 from the pedestal 60 to the source 80 is shown as connected at 82 to the pedestal 60 and running through the floor and ultimately to a conveniently located couch pit 85. The extension 70 connects the interior of the pedestal 60 with the lowermost casting 65, and all of these castings are largely hollow and open at both top and bottom so that they similarly connect with the pedestal 60 for the free flow of white water thereto.

The castings 66 each incorporate means for effecting controlled suction and drainage of white water through the associated suction rolls and for delivernig such white water by way of the cross tubes 67—68 to the associated casting 65. This control means, as well as the general construction and mounting arrangement for one of the suction rolls, are shown in detail in FIGS. 5 and 6, and the same structure is indicated as employed for each of the other suction rolls.

Figure 5:
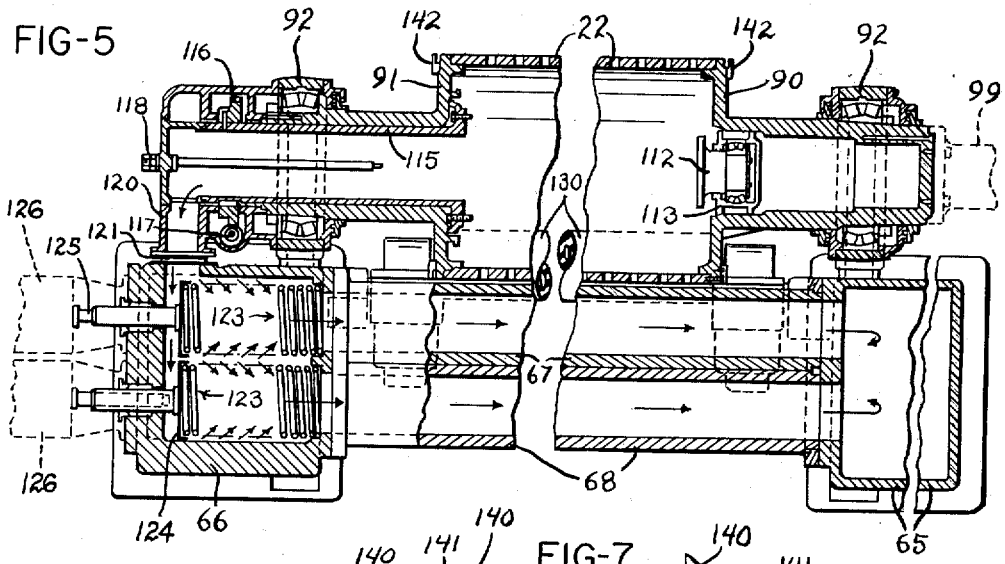
FIG. 5 is an enlarged fragmentary view in horizontal section taken as indicated by the line 5—5 of FIG. 3.
Figure 6:
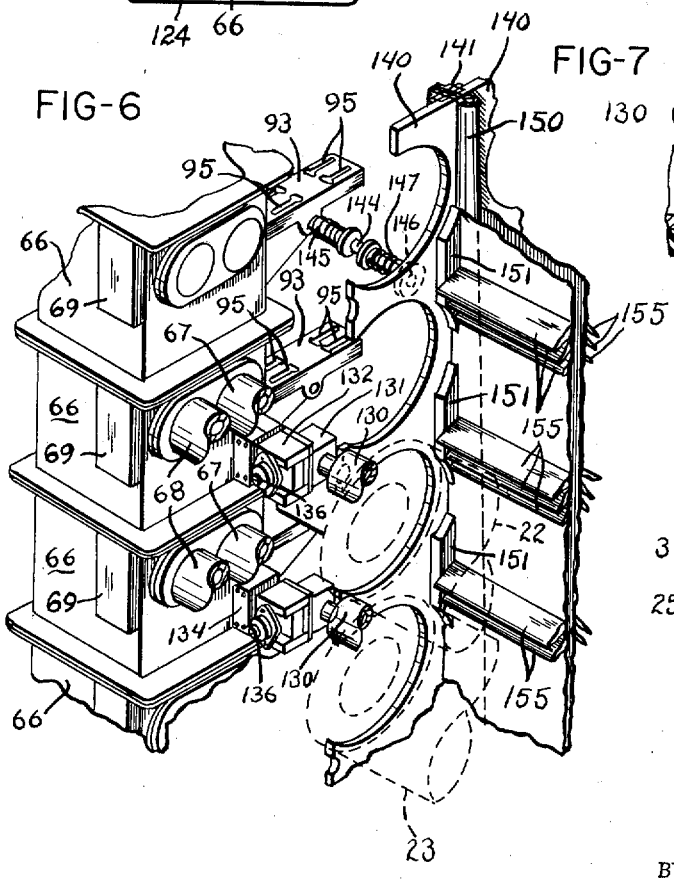
FIG. 6 is a fragmentary and somewhat diagrammatic view in the nature of a perspective illustrating internal structural details of the machine of FIGS. 1–5, and particularly details of the members for sealing the forming zone.

Referring to FIG. 5, the heads 90 and 91 of suction roll 22 are journaled in bearings 92 each mounted on a platform bracket 93 on the inner side of the associated casting 65 or 66. As shown in FIG. 6, means are provided, such as slots 95 in each of the brackets 93 to receive the mounting bolts 96 for the bearings 92, for effecting adjustment of the bearings 92 towards and away from the castings 65—66 to regulate the effective width of the nip formed by the roll 22 and its corresponding suction roll 32 in the other side of the machine. A similarly adjustable mounting is provided for each of the other suction rolls as well as each of the breast rolls 20 and 30, for the same purpose.

Figure 10:
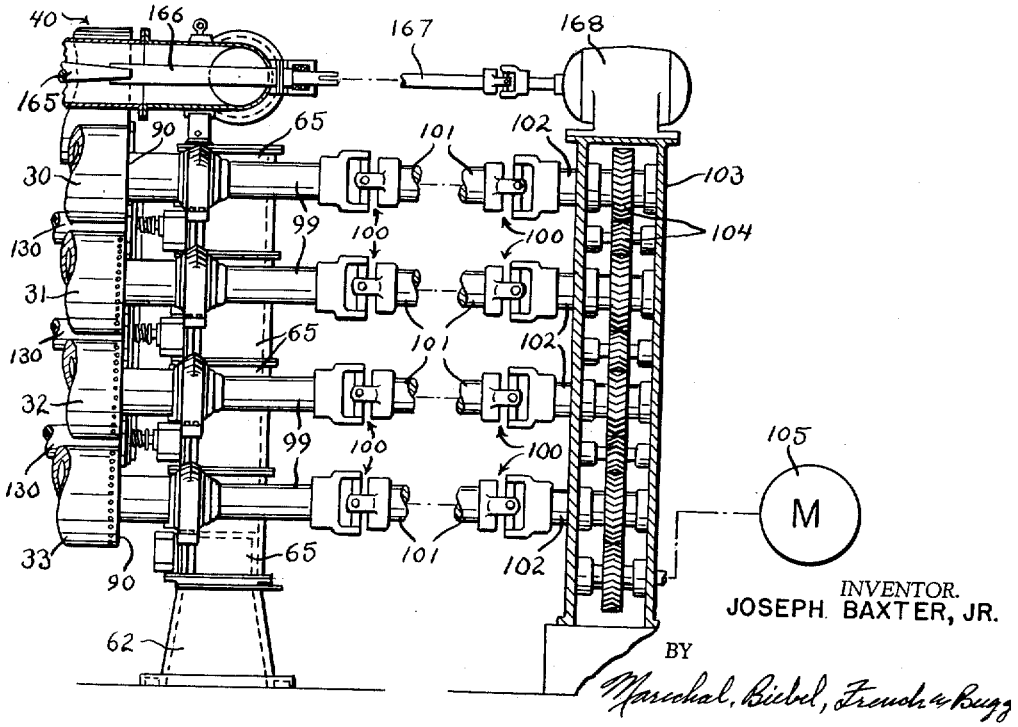
FIG. 10 is a somewhat diagrammatic fragmentary elevational view illustrating a suitable drive arrangement and additional details of the paper machine of FIGS. 1–9.

All of the rolls 20—23 and 30—33 are positively driven at the same peripheral speed, and a suitable drive arrangement is shown in FIG. 10 in connection with the rolls 30—33. In FIG. 10, the head 90 of each of the rolls on the drive side of the machine has a drive shaft 99 secured thereto. In order to provide for the desired pivotal movement of the entire roll section as described for changing the forming web, each drive shaft 99 is connected by a universal coupling 100 to a floating shaft 101 which is in turn connected by a second universal coupling 100 to a power shaft 102 projecting from the gear case 103 incorporating suitable gears 104 to which the main drive motor 105 is connected as indicated in FIG. 10.

The rolls on the side of the machine which is provided with the take-off roll 47 and felt 46 should preferably be directly synchronized with the press section and other parts of the machine, so that the drive motor 105 may represent the main drive motor for the machine as a whole. The rolls 20—23 in the other section should then be driven in such manner as to be accurately synchronized with the rolls 30—33 so that the forming webs 25 and 35 travel at identical speeds. A convenient manner of accomplishing this result is to provide the rolls 20—23 with an identical drive arrangement to that shown in FIG. 10 but including a separate drive motor which is then synchronized with the main drive motor 105 as by means of conventional electric tachometers such as are indicated at 106 in FIG. 1.

Within each of the several suction rolls is a suction box indicated generally at 110, which may be of conventional construction including seals 111 defining the effective suction area of the associated roll, and which may include provision for adjustment as shown in FIG. 5. Thus one end of this suction box is carried by a stub shaft 112 in bearings 113 in the head 90, and the other end is carried by a tubular shaft 115 which projects through the head 91 and carries a worm gear 116 meshing with an adjusting drive worm 117. FIG. 5 also indicates at 118 the adjusting mechanism for the usual deckles (not shown) within the suction roll 22.

The tubular shaft 115 also forms a conduit for conducting white water from the interior of the associated suction roll 22 to a connection 120 into the interior of the casting 66, and this connection incorporates telescoping or otherwise adjustable parts to provide for the lateral adjusting movement of the suction roll with respect to the casing 65, as indicated by the bellows diaphragm 121. From the casting 66, the water flows by way of the cross tubes 67—68 to the associated casting 65, and in order to regulate this flow, and thereby to control the volumetric rate at which the associated suction roll is able to remove water from the sheet, the casting 66 is provided with adjustable valve means controlling the inlet ends of the cross tubes 67—68. Thus each of the tubes 67—68 is shown as provided at its inlet end with a valve 123 comprising a rubber covered helical spring arranged for controlled compression by a head member 124 which is threaded on the drive shaft 125 of a control motor 126. Compression of the valve springs 123 produces gradual throttling of the flow into the associated tubes 67—68, and when these springs are fully compressed, the valves are closed.

Figure 4:
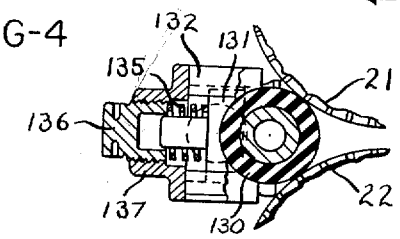
FIG. 4 is an enlarged fragmentary section on the line 4—4 of FIG. 3, with parts further broken away.

Special provision is made for assuring adequate sealing between each pair of superimposed rolls and also between the ends of the several rolls in such manner as effectively to enclose the entire forming chamber. Referring particularly to FIGS. 1 and 3–4, the seal means between each pair of superimposed rolls comprises a rubber covered roll 130 journaled at each end in a slide 131 which is movable generally horizontally in a guide block 132, and each guide block 132 is pivoted at 133 in a mounting 134 on the side of the casting 65 or 66 to permit such pivoting movement of each guide block as may be required to locate the associated seal roll 130 in accurately sealing engagement with each of its associated breast or suction rolls. A spring 135 is mounted between the slide 131 and an adjusting screw 136 in the outer end cover 137 for each guide block 132. The seal rolls 130 are therefore continuously urged into sealing engagement with their associated suction or breast rolls, and it will also be noted in FIG. 1 that one of the seals 111 is located to coincide with each nip of its associated suction roll and a seal roll 130.

Figure 8:
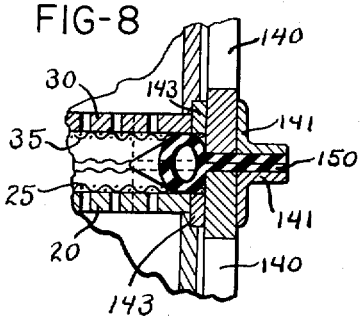
FIG. 8 is an enlarged fragmentary section on the line 8—8 of FIG. 3 to illustrate the sealing mechanism between side edges of the forming webs.

The sealing means at the ends of the suction and breast rolls include a pair of end plates 140 at each side of the machine which cooperate with a pair of vertically extending angles 141 to form a wall as shown in FIG. 6. The pltaes 140 are of low friction material and engage the ends of the seal rolls 130 and wear rings 142 of low friction material carried by the heads of the several suction rolls as shown in FIG. 5, the outer edges of the plates 140 being cut out to fit around the journals of these rolls while still affording adequate sealing surface. FIG. 8 shows the breast rolls 20 and 30 as fitted with an alternative construction of replaceable wear rings 143.

Figure 7:
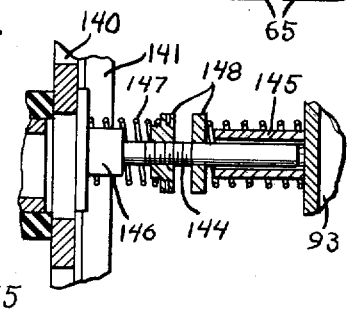
FIG. 7 is an enlarged fragmentary section on the line 7—7 of FIG. 3.

Each of the sealing walls 140—141 is mounted in yielding engagement with its cooperating sealing surfaces, but it is not necessary to apply particular force to the walls, since in operation they are drawn into increased sealing engagement by the vacuum developed through each suction roll. FIGS. 6 and 7 show a mounting arrangement which is satisfactory, and which comprises a plurality of rods 144 each having a telescoping mounting in a sleeve 145 carried by one of the brackets 93 and in a head 146 secured to the adjacent plate 140. Springs 147 and adjusting nuts 148 threaded on the rods 144 provide the desired biasing force for initially urging the walls 140—141 into sealing position.

The walls 140—141 also incorporate eans for maintaining a continuous seal between the opposed outer edge portions of the forming webs 25 and 35 to prevent lateral drainage of water from the sheet. Referring to FIG. 8, a thin wall section 150 of suitable plastic material such as a polyethylene resin is closed at the bottom and clamped between the angles 141 in such manner as to form a tube adapted to be inserted between the opposed edges of the two forming webs. This tube extends upwardly from just above the nip of rolls 23—33 through the forming nip 38 of the breast rolls, and it is filled with liquid to a somewhat higher pressure than that imposed by the stock between the webs. Under these conditions, the liquid pressure within the tube 150 tends to balance the water pressure within the forming chamber, while its excess pressure causes the tube to conform to the contour of the space between the forming webs, with its uppermost portion assuming a somewhat rounded cross section while its lowermost portion assumes a flattened contour of practically no thickness. While the tension in the webs is ordinarily sufficient to maintain them in sealing engagement with the tube 150, guide blocks 151 of low friction material may be provided on the inner surfaces of the plates 140 for guiding the portions of the webs passing from one roll to the next.

It will thus be seen that the end walls 140—141 and seal rolls 130 effectively cooperate with the several rolls to enclose the space betwen each pair of vertically disposed rolls. Since provision is made as already described for regulating the effective flow of water from each suction roll, and hence for establishing the desired vacuum conditions in the space above such suction roll, the construction of the invention in effect establishes a plurality of different zones between the breast rolls and the lowest pair of suction rolls and also provides for individual control of vacuum in each of these zones. These conditions result in one of the important advantages provided by this invention, particularly from the standpoint of improved control over the conditions of sheet formation.

Although each forming web has little more than line contact with any of the suction rolls, except for the lowermost rolls 23 and 33, the establishment of suction zones as described makes it possible to remove water through a substantially greater area of the surface of each of the suction rolls, namely over the entire angular area between its nip with the web and the seal roll 130 which engages its upper surface. Special additional provision is made by the invention for taking advantage of this fact, by means of one or more deflector plates 155 arranged as shown in FIG. 1 in the spaces above the nip of each horizontally disposed pair of suction rolls, and which are readily mounted in position by means of the guide blocks 151. Each of these deflector plates 155 has its upper edge in close proximity to the adjacent web 25 or 35, but the remainder of the plate diverges downwardly with respect to the web so that whatever water flows out through the web above each one of these plates is deflected away from the web and caused to run onto the upper surface of the associated suction roll well in advance of the line of contact between this roll and the web. Thus a substantial amount of water can be removed as a given point on the forming web passes from one horizontal pair of rolls to the next, and at the same time there is effective avoidance of the tendency of the water to form a pool immediately above the nip of each pair of suction rolls. In addition, whatever liquid tends to follow the downwardly moving surfaces of the rolls 20—22 and 30—32 will either be thrown off onto the upper surface of the next lower roll or will be squeezed off by the associated seal roll 130, and in either case will be removed through such lower roll before it reaches the forming web.

The headbox 40 is shown as constructed in accordance with my application Serial No. 732,324, filed May 1, 1958 and assigned to the same assignee as this application. It includes a cylindrical casing 160 which extends the full width of the machine and is provided with multiple perforations as indicated at 161. This casing 160 is connected at opposite ends to inlet and outlet connections 162 and 163 which are in turn supported by brackets 164 on the uppermost castings 65 and 66. Within the casing 160 is a mandrel 165 which tapers to diverge from the inlet connection 162 in order to effect substantially uniform pressure discharge of the incoming stock through the perforations 161 over the entire length of the perforated casing 160.

As described in my above application, the mandrel 165 is supported for rotation on a driven shaft 166 connected as indicated at 167 with a drive otor 168, which is shown in FIG. 10 as conveniently mounted on the gear case 103, and the mandrel carries a plurality of bars 168 of generally airfoil shape in section which operate to maintain the inner surface of the casing 160 free of particles too large to pass through the perforations 161. Such reject particles are continuously removed for further screening or other treatment by way of the outlet connection 163 through which the excess stock is continuously discharged.

The perforate casing 160 is surrounded by an outer casing 170 which receives the screened stock discharged through the perforations 161, and this casing 170 includes the pair of depending lips 41 and 42 which define the downwardly extending discharge passage 44 as already described. As shown particularly in FIG. 2, these lips are preferably extended downwardly into the upper portion of the nip 38 of the breast rolls 20 and 30 so that they deliver the screened stock continuously and directly into this nip. FIG. 1 also shows an adjustable mounting for the headbox to shift the lips 41—42 with respect to the breast rolls, this mounting including a supporting block 171 for each bracket 164 having a beveled upper surface which receives the beveled under surface of a saddle member 172 an the bracket. Adjusting screws 173 on the saddle member cooperate with the ends of the block 171 to shift the headbox laterally while also raising or lowering it slightly along the beveled surface of the block, and additional provision for lateral shifting of the headbox may be made by means of slots 174 for the bolts 175 which convert the brackets 164 and blocks 171. This mounting arrangement also facilitates temporary removal of the headbox, by means of a crane and eyebolts 176, when it is necessary to change the forming webs.

In addition to the advantages which this headbox construction provides in assuring effective screening of the stock in the practically closest location to the breast roll, the construction of the invention in the other parts immediately adjacent the initial forming zone provide further significant advantages. Thus in conventional Fourdrinier machines, special complex provisions must be made to assure maximum uniformity of relative adjustment between the two slice lips and also the maximum rigidity in the upper lip. With the machine of the invention, such structure is unnecessary, since it is the two breast rolls 20 and 30 which define the effective forming nip and are readily machined to a high degree of uniformity, they can be adjusted by means of their adjustable bearings as described to assure a uniformly precise nip width across the entire width of the machine.

Another important advantage provided by the invention is the effective elimination of entrained air at the forming nip. In the first place, in the operation of a conventional Fourdrinier machine, as the sheet of liquid stock effectively leaps from the slice onto the forming wire and breast roll, it enters a zone of relatively stagnant air which produces a backward lag on its top surface similar to the effect of wind blowing across the surface of a pond. At the same time, the outward flow of stock from the slice creates a zone of relatively low pressure immediately adjacent the upper slice lip into which the surrounding air is drawn, and since this inrush of air is often partially and irregularly obstructed by impediments such as lip adjustments and footwalk brackets, the resulting conditions of nonuniformity may seriously interfere with the desired distribution of the stock across the wire. These conditions increase in severity with increase in the size and speed of the operation of the machine, but they are effectively eliminated in the machine of the present invention, in large measure by reason of the arrangement of the two breast rolls in combination with the discharge lips of the headbox as just described.

Figure 2:
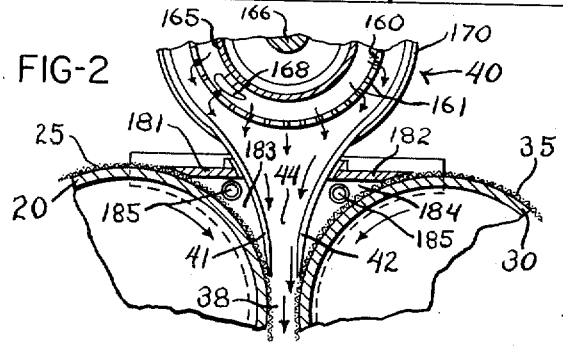
FIG. 2 is an enlarged fragment of FIG. 1 further illustrating details of the forming zone of the machine.

Additional control of atmospheric conditions in and immediately adjacent the forming zone is also provided by the structure of the invention which effectively strips the forming webs of entrained air before they receive the stock from the discharge passage 44. Referring particularly to FIGS. 1 and 2, the space above that portion of each of the breast rolls which is moving downwardly to the nip 38 is substantially covered by a doctor blade 181 or 182 which is shown as secured to the outer surface of the associated lip 41 or 42 and extends therefrom into close proximity with the top of the adjacent breast roll. Each of these doctor blades thus acts to skim the majority of the windage from the associated web 25 or 35 as the latter moves past the outer edge of the blade toward the nip 38, and at the same time the doctor blade cooperates with its associated breast roll and discharge lip to provide a substantially closed chamber 183 or 184 immediately above the nip 38.

In order to complete the prevention of entry of air into these chambers 183 and 184, means such as a pipe 185 is connected with each of the chambers 183 and 184 to supply steam thereto at a pressure sufficient for bleeding of the steam back through the slot between the associated doctor blade and breast roll, reference in this connection being made to my copending application Serial No. 745,479, filed June 30, 1958 and assigned to the same assignee as this application. This escaping steam cooperates with the doctor blades to strip all air from the forming webs as they enter the chambers 183 and 184, and whatever additional steam escapes between the webs and the lips 41 and 42 is merely condensed into the stock for subsequent removal during formation of the sheet.

In the operation of this paper machine, therefore, an essentially solid stream of stock is delivered directly to the nip 38 of the breast rolls for downward flow between the two forming webs 25 and 35, and as it travels toward the lowermost pair of suction rolls, the water is progressively removed by means of the several suction rolls to form the sheet 45. Since there is substantially no air present in the stock, and since also the liquid is removed without the passage of air through the sheet, highly desirable structural conditions are established in the sheet. Thus the fines, whether they be short fibers or other small particles, will tend to migrate to the surface of the sheet with the initial water removed, but if the openings in the forming webs are sufficiently small, which is one reason the invention contemplates the use of fabric forming webs, these fines will be trapped at the surfaces of the sheet in such manner as to form in effect a filter mat on which the remainder of the suspensoids in the stock will be deposited as drainage progresses. In addition, since the order in which the suspensoids move toward the surfaces is progressive in accordance with their sizes, the long fibers will tend to be concentrated in the central layers of the sheet to provide the strongest possible backing for the fine particles which will form the desired smooth outer surfaces. Thus for many purposes, the sheet produced in this manner may be sufficiently smooth for use without additional coating, but if coating is required for a glossy surface or the like, considerably smaller quantities of coating material will be needed than in the case of paper produced by conventional techniques.

Figure 9:
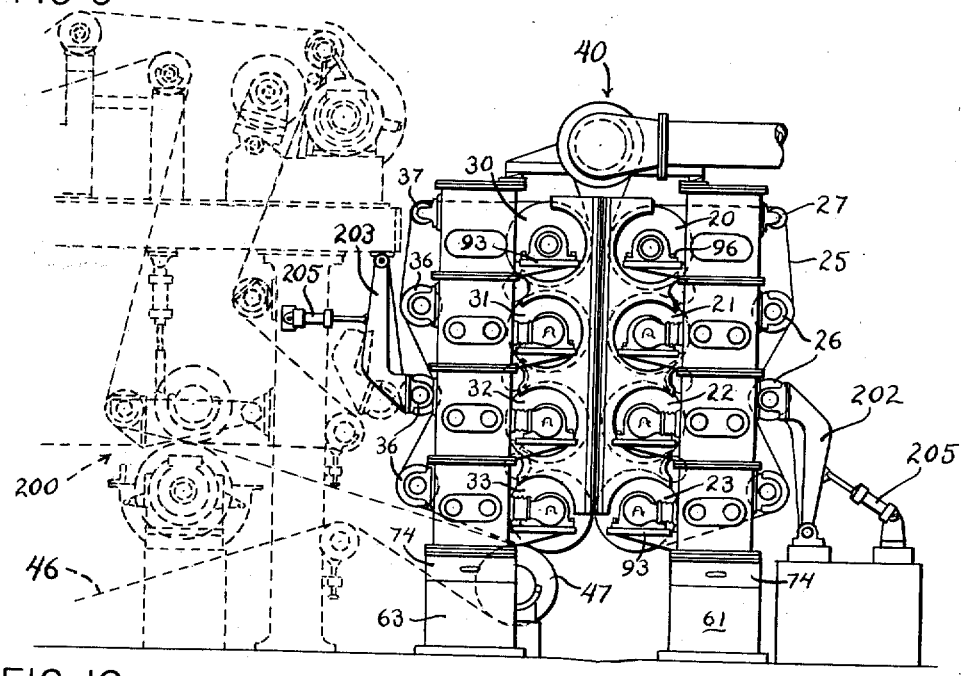
FIG. 9 is an elevational view looking at the tending side of the paper machine of FIGS. 1–8 and illustrating its operating connections with the first press section such as is used with conventional paper machines.

The construction of the paper machine of the invention as describes offers additonal practical advantages. In particular, it will be apparent that while the forming machine of the invention is adapted for use wherever a conventional Fourdrinier forming section could be used, and will connect similarly with the subsequent stations of the machine for further handling of the sheet, it has considerably smaller requirements of floor space. Thus FIG. 9 shows a forming section constructed as described in connection with FIGS. 1–8 together with the first press section 200 and [ossociated] *associated* equipment of a complete paper machine, the parts in dotted lines in FIG. 9 being conventional. FIG. 9 also shows a convenient arrangement for mounting the guide rolls 26 and 36 which serve as stretch rolls for the forming webs 25 and 35, each of these rolls being mounted on swinging arms 202 and 203 mounted adjacent the forming section of the machine and provided with fluid pressure cylinders 205 for supplying the desired tensioning force.

FIG. 9 also illustrates in an effective manner the greatly reduced requirements of floor space for a forming section constructed in accordance with the invention in comparison with a conventional Fourdrinier forming section. For example, with FIG. 9 drawn in scale to include the portion of the press section of an existing 272-inch newsprint machine, the forming section constructed in accordance with the invention requires 50 feet less floor space lengthwise of the machine than a conventional Fourdrinier forming section. In addition, the forming section of the invention can be increased in height, in order to increase the effective forming length and therefore the available speed range, without altering its requirements of floor space. In fact, this latter objective can be accomplished with particular ease by means of the invention, since it requires the mere addition of one or more pairs of suction rolls, and since the invention provides each roll as a modular unit including its own mounting castings 65—66 and connecting tubes 67—68, the incorporation of additional such units requires no change in the basic construction or space requirements.

As just noted, the number of pairs of suction rolls required for a given machine depends upon the desired speed of operation for the machine, and the size of the individual rolls is also related to the desired speed of operation. Thus for a maximum speed of the order of 600 feet per minute, satisfactory results are obtainable with a single pair of suction rolls in the position of the rolls 21 and 31 below the breast rolls 20 and 30, and with all four of these rolls 36 inches in diameter. To increase the operating speed, additional pairs of suction rolls are added as described, and with the specific number and arrangement of rolls shown in the drawings, satisfactory results are obtainable with rolls 36 inches in diameter at speeds at least as high as 1200 to 1500 feet per minute. For greater speeds of operation, if it be found that the increase in centrifugal force due to increased angular speed of the rolls undesirably affects the inward flow of liquid to the suction rolls, this angular speed and the resulting centrifugal force can be reduced by appropriate increase in the diameter of the rolls, as can readily be calculated for a desired range of operating conditions.

It should also be noted that the establishment of preferred operating conditions is facilitated by locating vertically adjacent rolls in relatively closely spaced relation, for a number of reasons. As a practical matter, close spacing of the rolls minimizes the size required for the sealing rolls 30 as well as the sealing forces which these rolls must exert, and also it reduces the distances which the forming webs must travel without supporting between adjacent rolls. An additional significant factor related to the vertical spacing of adjacent rolls appears to be the action of the vertically opposed areas of these rolls in tending to throw liquid tangentially outwardly therefrom. Thus with the rolls closely spaced as shown, the tangential discharge of liquid from the lower surface of each roll will to a considerable extent tend to strike the upper surface of the adjacent lower roll, and will also tend to meet the tangential discharge from the upper surface of such adjacent roll. The result of these conditions is believed to be either that the downward discharge will tend to be thrown into the lower suction roll in opposition to the outward effects of the centrifugal force of the suction roll, or the opposed streams will tend to neutralize their tangential velocities so that the liquid will be more readily subject to the combined effects of gravity and suction tending to force it into the interior of the suction roll.

While the forms of apparatus herein described constitute preferred embodiments of the invention, it is to be understood that the invention is not limited to these precise forms of apparatus, and that changes may be made herein without departing from the scope of the invenion which is defined in the appended claims.

What is claimed is:

1. A paper machine of the character described comprising a pair of breast rolls supported in closely spaced relation in a horizontal plane to define a vertically extending nip therebetween, means forming a headbox located on one side of said nip and including a pair of lips defining a discharge passage for stock from said headbox, means supporting said headbox with said lips extending generally vertically substantially within said nip to deliver stock directly from said headbox to said nip, at least one pair of suction rolls associated with said breast rolls respectively, means supporting said suction rolls in generally vertically spaced relation with said breast rolls on the opposite side of said nip from said headbox with each such pair of suction rolls progressively more closely horizontally spaced than said breast rolls, a pair of separate forming webs trained around associated said breast and suction rolls for generally vertical travel in progressively more closely horizontally spaced relation to receive therebetween the stock discharged from said headbox, means associated with said suction rolls for withdrawing and removing liquid from the stock through said webs to form a sheet between said forming webs, and means for receiving and conducting away said sheet from said pair of suction rolls.

2. A paper machine of the character described comprising a pair of breast rolls, frame means supporting said breast rolls in closely spaced relation in a horizontal plane to define a vertically extending nip therebetween, at least one pair of suction rolls associated with said breast rolls respectively and supported on said frame means in generally vertically spaced relation below said breast rolls with each such pair of suction rolls being progressively more closely horizontally spaced than said breast rolls, a pair of separate forming webs trained around associated said breast and suction rolls for downward travel in progressively more closely horizontally spaced relation, means forming a headbox supported on said frame means above said breast rolls for delivering stock downwardly to said nip for downward flow between said forming webs, means cooperating with said headbox and said rolls to seal the space through which said webs travel between said rolls against escape of liquid laterally of said webs, means associated with said suction rolls for withdrawing and removing liquid through said webs and from said space to form a sheet between said webs, and means below the lowest said pair of suction rolls for receiving and conducting away said sheet.

3. A paper machine of the character described comprising a pair of breast rolls, frame means supporting said breast rolls in closely spaced relation in a horizontal plane to define a vertically extending nip therebetween, at least one pair of [suction] *other* rolls associated with said breast rolls respectively and supported on said frame means in generally vertically spaced relation below said breast rolls with each such pair of [suction] *other* rolls being progressively more closely horizontally spaced than said breast rolls, *at least one of the lowermost said pair of other rolls being a suction roll,* a pair of separate forming webs trained around associated said breast and [suction] *other* rolls for downward travel in progressively more closely horizontally spaced relation, means forming a headbox supported on said frame means above said breast rolls for delivering stock downwardly to said nip for downward flow between said forming webs, means cooperating with said headbox and said rolls to seal the space through which said webs travel between said rolls against escape of liquid laterally of said webs, [suction means associated with said suction rolls] *drainage means* for withdrawing and removing liquid through said webs and from said space to form a sheet between said webs, means for controlling said [suction] *drainage* means [individually for each said suction roll] to establish and maintain predetermined vacuum conditions in the portion of said space [above each said suction roll,] *between each said pair of associated rolls,* and means below the lowest said pair of [suction] *other* rolls for receiving and conducting away said sheet.

4. A paper machine of the character described comprising a pair of breast rolls, frame means supporting said breast rolls in closely spaced relation in a horizontal plane to define a vertically extending nip therebetween, said frame means including a pair of upright columns at the ends of each of said breast rolls, at least one pair of [suction] *other* rolls associated with said breast rolls respectively and supported on the associated said columns in generally vertically spaced relation below said breast rolls with each such pair of [suction] *other* rolls being progressively more closely horizontally spaced than said breast rolls, *at least one of the lowermost said pair of said other rolls being a suction roll,* a pair of separate forming webs trained around associated said breast and [suction] *other* rolls for downward travel in progressively more closely horizontally spaced relation, means forming a headbox supported on said frame means above said breast rolls for delivering stock downwardly to said nip for downward flow between said forming webs, means supporting one of said columns in each said pair for rotational movement on a generally vertical axis to support the associated said column and rolls in cantilevered position for changing said forming web thereon, means [associated with said suction rolls] for withdrawing and removing liquid through said webs to form a sheet between said webs, and means below the lowest said pair of [suction] *other* rolls for receiving and conducting away said sheet.

5. A paper machine of the character described comprising a pair of breast rolls, frame means supporting said breast rolls in closely spaced relation in a horizontal plane to define a vertically extending nip therebetween, at least one pair of [suction] *other* rolls associated with said breast rolls respectively and supported on said frame means in generally vertically spaced relation below said breast rolls with each such pair of [suction] *other* rolls being progressively more closely horizontally spaced than said breast rolls, *at least one of the lowermost said pair of other rolls being a suction roll,* a pair of separate forming webs trained around associated said breast and [suction] *other* rolls for downward travel in progressively more closely horizontally spaced relation, means forming a headbox supported on said frame means above said breast rolls and including a pair of lips extending downwardly substantially within said nip and defining a discharge passage for delivering stock from said headbox directly to said nip for downward flow between said forming webs, doctor means extending substantially from the outside of each of said lips to the top of the adjacent said breast roll to skim windage air from said forming webs approaching said nip and to form with the adjacent said lip a substantially closed chamber overlying said nip, means for supplying steam to each of said chambers at a pressure sufficient to minimize entry of air to said chambers, means [associated with said suction rolls] for withdrawing and removing liquid through said webs to form a sheet between said webs, and means below the lowest said pair of [suction] *other* rolls for receiving and conducting away said sheet.

6. A paper machine of the character described comprising a pair of breast rolls, frame means supporting said breast rolls in closely spaced relation in a horizontal plane to define a vertically extending nip therebetween, means forming a headbox supported above said breast rolls for delivering stock downwardly to said nip, at least one pair of [suction] *other* rolls associated with said breast rolls respectively, means supporting said [suction] *other* rolls in generally vertically spaced relation below said breast rolls with each such pair of [suction] *other* rolls progressively more closely horizontally spaced than said breast rolls, a pair of separate forming webs trained around associated said breast and [suction] *other* rolls for downward travel in progressively more closely horizontally spaced relation to receive therebetween the stock discharged from said headbox, means cooperating with said headbox and said rolls to seal the space through which said webs travel between said rolls against escape of liquid laterally of said webs, means [associated with said suction rolls] for withdrawing and removing liquid from the stock through said webs and from said space to form a sheet between said webs, at least one deflector member extending above each [of] said pair of [suction] *other* rolls in closely spaced and downwardly diverging relation with the adjacent said forming web to direct freely flowing liquid [onto the surface of said suction roll] *toward said liquid withdrawing means* in advance of the nip of *the subjacent* said pair of [suction] *other* rolls, and means below said [suction] *other* rolls for receiving and conducting away said sheet.

7. A paper machine of the character described comprising a pair of breast rolls, frame means supporting said breast rolls in closely spaced relation in a horizontal plane to define a vertically extending nip therebetween, a [plurality of pairs of suction] *pair of couch* rolls associated with said breast rolls respectively and supported on said frame means in generally vertically spaced relation below said [breast rolls with each such pair of suction rolls being progressively more closely horizontally spaced than said] breast rolls, a pair of separate forming webs trained around associated said breast and [suction] *couch* rolls for downward travel in progressively more closely horizontally spaced relation, means forming a headbox supported on said frame means above said breast rolls for delivering stock downwardly to said nip for downward flow between said forming webs, means [associated with said suction rolls] for withdrawing and removing water through said webs to form a sheet between said webs, means above [the lowest said pair of suction] *said couch* rolls for trimming said sheet to provide trim strips at either side of said sheet, means below one of [the lowest] said [pair of suction] *couch* rolls for receiving and conducting away said sheet, and means associated with the other of said [lowest pair of suction] *couch* rolls for effecting removal of said trim strips from said sheet.

8. A paper machine of the character described comprising a pair of breast rolls, frame means supporting said breast rolls in closely spaced relation in a horizontal plane to define a vertically extending nip therebetween, a plurality of pairs of suction rolls associated with said breast rolls respectively and supported on said frame means in generally vertically spaced relation below said breast rolls with each such pair of suction rolls being progressively more closely horizontally spaced than said breast rolls, a pair of separate forming webs trained around associated said breast and suction rolls for downward travel in progressively more closely horizontally spaced relation, a headbox supported on said frame means above said breast rolls and including means defining a downwardly extending discharge passage for delivering stock to said nip for downward flow between said forming webs and outward flow of water through said webs to form a sheet between said webs, rotary means forming a seal between each adjacent pair of said vertically spaced rolls, means forming a wall on either side of said machine in sealed relation with the ends of said rolls and the edges of said webs, suction means cooperating with said suction rolls to withdraw said water from the space defined by each said pair of vertically spaced rolls and the associated said web, and means below the lowest said pair of suction rolls for receiving and conducting away said sheet.

9. A paper machine of the character described comprising a pair of breast rolls, frame means supporting said breast rolls in closely spaced relation in a horizontal plane to define a vertically extending nip therebetween, a plurality of pairs of suction rolls associated with said breast rolls respectively and supported on said frame means in generally vertically spaced relation below said breast rolls with each such pair of suction rolls being progressively more closely horizontally spaced than said breast rolls, a pair of separate forming webs trained around associated said breast and suction rolls for downward travel in progressively more closely horizontally spaced relation, a headbox supported on said frame means above said breast rolls and including means defining a downwardly extending discharge passage for delivering stock to said nip for downward flow between said forming webs and outward flow of water through said webs to form a sheet between said webs, rotary means forming a seal between each adjacent pair of said vertically spaced rolls, means forming a wall on either side of said machine in sealed relation with the ends of said rolls and the edges of said webs, suction means cooperating with said suction rolls to withdraw said water from the space defined by each said pair of vertically spaced rolls and the associated said web, means for controlling said suction means individually for each said suction roll to establish and maintain predetermined vacuum conditions in each said space, and means below the lowest said pair of suction rolls for receiving and conducting away said sheet.

10. A paper machine of the character described comprising a pair of breast rolls, frame means supporting said breast rolls in closely spaced relation in a horizontal plane to define a vertically extending nip therebetween, a plurality of pairs of suction rolls associated with said breast rolls respectively and supported on said frame means in generally vertically spaced relation below said breast rolls with each such pair of suction rolls being progressively more closely horizontally spaced than said breast rolls, a pair of separate forming webs trained around associated said breast and suction rolls for downward travel in progressively more closely horizontally spaced relation, a headbox supported on said frame means above said breast rolls and including means defining a downwardly extending discharge passage for delivering stock to said nip for downward flow between said forming webs and outward flow of water through said webs to form a sheet between said webs, rotary means forming a seal between each adjacent pair of said vertically spaced rolls, means forming a wall on either side of said machine in sealed relation with the ends of said rolls and the edges of said webs, suction means cooperating with said suction rolls to withdrawn said water from the space defined by each said pair of vertically spaced rolls and the associated said web, deflector means in each said space extending above each said suction roll in close relation with said web for directing freely flowing water onto the surface of said suction roll in advance of the area of contact of said roll with said web, and means below the lowest said pair of suction rolls for receiving and conducting away said sheet.

11. A paper machine of the character described comprising two pairs of base pedestals, a plurality of pairs of castings mounted on said pairs of pedestals respectively to form two pairs of columns, a [pair of] breast *roll* [rolls] mounted at the top of each said pair of columns with said breast rolls closely spaced in a horizontal plane to define a vertically extending nip therebetween, a suction roll supported by each said pair of castings in generally vertically aligned relation below the associated said breast roll and with each of the resulting pairs of suction rolls being progressively more closely spaced in a horizontal plane than said breast rolls, a pair of separate forming webs trained around associated said breast and suction rolls for downward travel in progressively more closely horizontally spaced relation, a headbox supported on said columns above said breast rolls and including means defining a downwardly extending discharge passage for delivering stock to said nip for downward flow between said forming webs and outward flow of liquid through said webs to form a sheet between said webs, means directly connecting all of said castings in a first column of each said pair of columns for free flow of liquid therebetween, means for connecting each said first column with a source of suction, means connecting the interior of each of said suction rolls with the associated said casting in the second column of the associated said pair of columns, and a tube connecting each casting in each said second column with the associated casting in the associated first column for conducting thereto liquid from the associated said suction roll.

12. A paper machine of the character described comprising two pairs of base pedestals, a plurality of pairs of castings mounted on said pairs of pedestals respectively to form two pairs of columns, a [pair of] breast *roll* [rolls] mounted at the top of each said pair of columns with said breast rolls closely spaced in a horizontal plane to define a vertically extending nip therebetween, a suction roll supported by each said pair of castings in generally vertically aligned relation below the associated said breast roll and with each of the resulting pairs of suction rolls being progressively more closely spaced in a horizontal plane than said breast rolls, a pair of separate forming webs trained around associated said breast and suction rolls for downward travel in progressively more closely horizontally spaced relation, a headbox supported on said columns above said breast rolls and including means defining a downwardly extending discharge passage for delivering stock to said nip for downward flow between said forming webs and outward flow of liquid through said webs to form a sheet between said webs, means directly connecting all of said castings in a first column of each said pair of columns for free flow of liquid therebetween, means for connecting each said first column with a source of suction, means connecting the interior of each of said suction rolls with the associated said casting in the second column of the associated said pair of columns, a tube connecting each casting in each said second column with the associated casting in the associated first column for conducting thereto liquid from the associated said suction roll, and valve means associated with each said tube for controlling the flow therethrough to establish and maintain predetermined vacuum conditions in each of said suction rolls.

13. A paper machine of the character described comprising two pairs of base pedestals, a plurality of pairs of castings mounted on said pairs of pedestals respectively to form two pairs of columns, a [pair of] breast *roll* [rolls] mounted at the top of each said pair of columns with said breast rolls closely spaced in a horizontal plane to defined a vertically extending nip therebetween, a suction roll supported by each said pair of castings in generally vertically aligned relation below the associated said breast roll and with each of the resulting pairs of suction rolls being progressively more closely spaced in a horizontal plane than said breast rolls, a pair of separate forming webs trained around associated said breast and suction rolls for downward travel in progressively more closely horizontally spaced relation, a headbox supported on said columns above said breast rolls and including means defining a downwardly extending discharge passage for delivering stock to said nip for downward flow between said forming webs and outward flow of liquid through said webs to form a sheet between said webs, means directly connecting all of said castings in a first column of each said pair of columns for free flow of liquid therebetween, means for connecting each said first column with a source of suction, means connecting the interior of each of said suction rolls with the associated said casting in the second column of the associated said pair of columns, a tube connecting each casting in each said second column with the associated casting in the associated first column for conducting thereto liquid from the associated said suction roll, and means supporting each of said first columns for rotational movement about a generally vertical axis on the associated said pedestal to support the associated said second column and rolls in cantilevered position for changing said forming web thereon.

14. A paper machine of the character described comprising two pairs of base pedestals, a plurality of pairs of castings mounted on said pairs of pedestals respectively to form two pairs of columns, a [pair of] breast [rolls] *roll* mounted at the top of each said pair of columns with said breast rolls closely spaced in a horizontal plane to define a vertically extending nip therebetween, a suction roll supported by each said pair of castings in generally vertically aligned relation below the associated said breast roll and with each of the resulting pairs of suction rolls being progressively more closely spaced in a horizontal plane than said breast rolls, a pair of separate forming webs trained around associated said breast and suction rolls for downward travel in progressively more closely horizontally spaced relation, a headbox supported on said columns above said breast rolls and including means defining a downwardly extending discharge passage for delivering stock to said nip for downward flow between said forming webs and outward flow of liquid through said webs to form a sheet between said webs, means directly connecting all of said castings in a first column of each said pair of columns for free flow of liquid therebetween, means for connecting each of said first column with a source of suction, means connecting the interior of each of said suction rolls with the associated said casting in the second column of the associated said pair of columns, a tube connecting each casting in each said second column with the associated casting in the associated first column for conducting thereto liquid from the associated said suction roll, means cooperating with said rolls to enclose the spaces defined by each pair of vertically aligned said rolls and the associated said forming webs, deflector means in each said space extending above each said suction roll in close relation with said web for directing freely flowing water onto the surface of said suction roll in advance of the area of contact of said roll with said *web* [wire], and means below the lowest pair of said suction rolls for receiving and conducting away said sheet.

15. A paper machine of the character described comprising two pairs of base pedestals, a pair of columns mounted on said pairs of pedestals respectively, a [pair of] breast [rolls] *roll* mounted at the top of each said pair of columns with said breast rolls closely spaced in a horizontal plane to define a vertically extending nip therebetween, a plurality of pairs of suction rolls supported by said pairs of columns in generally vertically spaced relation below said breast rolls and with each of said pairs of suction rolls being progressively more closely spaced in a horizontal plane than said breast rolls, a pair of separate forming webs trained around associated said breast and suction rolls for downward travel in progressively more closely horizontally spaced relation, a headbox supported on said columns above said breast rolls and including means defining a downwardly extending discharge passage for delivering stock to said nip for downward flow between said forming webs and outward flow of liquid through said webs to form a sheet between said webs, means in a first column of each said pair of columns defining a conduit for free flow of liquid therethrough, means for connecting each said conduit with a source of suction, means in the second of each said pair of columns defining a plurality of compartments each connected with the interior of one of said suction rolls, a tube connecting each said compartment with the associated first column for conducting thereto liquid from the associated said suction roll, means for individually regulating the liquid flow through each of said tubes, and means below the lowest pair of said suction rolls for receiving and conducting away said sheet.

16. A paper machine of the character described comprising a pair of breast rolls, frame means supporting said breast rolls in closely spaced relation in a horizontal plane to define a vertically extending nip therebetween, at least one pair of suction rolls associated with said breast rolls respectively and supported on said frame means in generally vertically spaced relation below said breast rolls with each such pair of suction rolls being progressively more closely horizontally spaced than said breast rolls, a pair of separate forming webs trained around associated said breast and suction rolls for downward travel in progressively more closely horizontally spaced relation, means forming a headbox supported on said frame means above said breast rolls and including a pair of lips defining a downwardly extending discharge passage for delivering stock from said headbox to said nip for downward flow between said forming web and drainage therethrough, means including walls cooperating with the ends of said rolls to enclose the spaces defined by each pair of vertically aligned said rolls and the associated said forming web, means cooperating with said walls to form seals between the opposed edge portions of said webs, means associated with said suction rolls for withdrawing and removing liquid from said spaces to form a sheet between said webs, and means below the lowest said pair of suction rolls for receiving and conducting away said sheet.

17. A paper machine as defined in claim 16 wherein said seal forming means comprise a tube of flexible material positioned between said opposed side edge portions of said forming webs at each side of said webs, and means for maintaining said tubes filled with liquid at a higher pressure than the pressure exerted laterally on said tubes by said stock.

18. A paper machine of the character described comprising a pair of breast rolls, frame means supporting said breast rolls in closely spaced relation in a horizontal plane to define a vertically extending nip therebetween, at least one pair of [suction] *other* rolls associated with said breast rolls respectively and supported on said frame means in generally vertically spaced relation below said breast rolls with each such pair of [suction] *other* rolls being progressively more closely horizontally spaced than said breast rolls, *at least one of the lowermost said pair of other rolls being a suction roll,* a pair of separate forming webs trained around associated said breast and [suction] *other* rolls for downward travel in progressively more closely horizontally spaced relation, a headbox supported on said frame means above said breast rolls and extending the full width of said [wires] *webs,* a pair of lips depending from said headbox substantially into said nip to define a downwardly extending discharge passage for delivering stock from said headbox to said nip for downward flow between said forming webs, means cooperating with said lips and said breast rolls to enclose a chamber overlying said nip on either side of said lips and to minimize access of air to said chambers, means cooperating with said headbox and said rolls to seal the space through which said webs travel between said rolls against escape of liquid laterally of said webs, means [associated with said suction rolls] for withdrawing and removing liquid through said webs and from said space to form a sheet between said webs, and means below the lowest said pair of [suction] *other* rolls for receiving and conducting away said sheet.

19. A paper machine of the character described comprising a pair of breast rolls, frame means supporting said breast rolls in closely spaced relation in a horizontal plane to define a vertically extending nip therebetween, at least one pair of [suction] *other* rolls associated with said breast rolls respectively and supported on said frame means in generally vertically spaced relation below said breast rolls with each such pair of [suction] *other* rolls being progressively more closely horizontally spaced than said breast rolls, *at least one of the lowermost said pair of other rolls being a suction roll,* a pair of separate forming webs trained around associated said breast and [suction] *other* rolls for downward travel in progressively more closely horizontally spaced relation, a headbox supported on said frame means above said breast rolls and extending the full width of said [wires] *webs,* a pair of lips depending from said headbox substantially into said nip to define a downwardly extending discharge passage for delivering stock from said headbox to said nip for downward flow between said forming web, means cooperating with said headbox and said rolls to seal the space through which said webs travel between said rolls against escape of liquid laterally of said webs, means within said headbox for effecting continuous screening of the stock entering said discharge passage, means [associated with said suction rolls] for withdrawing and removing liquid through said webs and from said space to form a sheet between said webs, and means below the lowest said pair of [suction] *other* rolls for receiving and conducting away said sheet.

20. A paper machine of the character described comprising a pair of breast rolls, frame means supporting said breast rolls in closely spaced relation in a horizontal plane to define a vertically extending nip therebetween, a pair of [suction] *couch* rolls associated with said breast rolls respectively and supported on said frame means in generally vertically spaced relation below said breast rolls and in more closely horizontally spaced relation than said breast rolls, *at least one of said couch rolls being a suction roll,* a pair of separate forming webs trained around associated said breast and [suction] *couch* rolls for downward travel in progressively more closely horizontally spaced relation, means forming a headbox supported on said frame means above said breast rolls for delivering stock downwardly to said nip for downward flow between said forming webs, means establishing a plurality of [suction] *drainage* zones on opposite sides of said webs between said breast rolls and said [suction] *couch* rolls, means cooperating with said rolls and said webs to seal said zones against escape of liquid laterally of said webs, [suction means for applying suction to] *controllable means for effecting drainage* from said zones to withdraw and remove liquid through said webs to form a sheet between said webs, means for regulating said [suction] *controllable* means individually for each of said zones, and means below said pair of [suction] *couch* rolls for receiving and conducting away said sheet.

21. A paper machine of the character described comprising a pair of breast rolls, frame means supporting said breast rolls in closely spaced relation in a horizontal plane to define a vertically extending nip therebetween, a pair of suction rolls associated with said breast rolls respectively and supported on said frame means in generally vertically spaced relation with said breast rolls and in more closely horizontally spaced relation than said breast rolls, a pair of separate forming webs trained around associated said breast and suction rolls for generally vertical travel in progressively more closely horizontally spaced relation, means forming a headbox supported on said frame means on the opposite side of said nip from said suction rolls for delivering stock to said nip for flow between said forming wires, means establishing a plurality of suction zones on opposite sides of said webs between said breast rolls and said suction rolls, means cooperating with said rolls and said webs to seal said zones against escape of liquid laterally of said webs, suction means for applying suction to said zones to withdraw and remove liquid through said webs to form a sheet between said webs, means for regulating said suction means individually for each of said zones, and means associated with said pair of suction rolls for receiving and conducting away said sheet.

22. A paper machine of the character described comprising a pair of breast rolls, frame means supporting said breast rolls in closely spaced relation in a horizontal plane to define a vertically extending nip therebetween, a pair of [suction] *couch* rolls associated with said breast rolls respectively and supported on said frame means in generally vertically spaced relation below said breast rolls and in more closely horizontally spaced relation than said breast rolls, *at least one of said couch rolls being a suction roll,* a pair of separate forming webs trained around associated said breast and [suction] *couch* rolls for downward travel in progressively more closely horizontally spaced relation, means forming a headbox supported on said frame means above said breast rolls for delivering stock downwardly to said nip for downward flow between said forming webs, means cooperating with said breast rolls for substantially preventing entrainment of air with said stock and the portions of said forming webs entering said nip, means establishing a plurality of [suction] *drainage* zones on opposite sides of said webs between said breast rolls and said [suction] *couch* rolls, means cooperating with said rolls and said webs to seal said zones against escape of liquid laterally of said webs, [suction means for applying suction to] *controllable means for effecting drainage from* said zones to withdraw and remove liquid through said webs to form a sheet between said webs, means for regulating said [suction] *controllable* means individually for each of said zones, and means below said pair of [suction] *couch* rolls for receiving and conducting away said sheet.

23. A paper machine of the character described comprising a pair of breast rolls, frame means supporting said breast rolls in closely spaced relation in a horizontal plane to define a vertically extending nip therebetween, a [plurality of pairs of suction] *pair of other* rolls associated with said breast rolls respectively and supported on said frame means in generally vertically spaced relation below said breast rolls [with each said pair of suction rolls being progressively] *and* more closely horizontally spaced than said breast rolls, a pair of separate forming webs trained around associated said breast and [suction] *other* rolls for downward travel in progressively more closely horizontally spaced relation, means forming a headbox supported on said frame means above said breast rolls and including a pair of lips defining a downwardly extending discharge passage for delivering stock from said headbox to said nip for downward flow between said forming webs and drainage therethrough, means including walls cooperating with the ends of said rolls to enclose the spaces defined by each pair of vertically aligned said rolls and the associated said web, means cooperating with said walls to form seals between the opposed edge portions of said webs, means [associated with said suction rolls] for withdrawing and removing liquid from said spaces to form a sheet between said webs, a plurality of deflector plates arranged in each of said spaces in vertically spaced relation with each other, each of said deflector plates having the upper edge thereof adjacent one of said forming webs and having the remainder thereof in diverging relation with said web to direct freely flowing water [onto the surface of the subjacent said suction roll], *away from said web and toward said liquid withdrawing means,* and means below the lowest said pair of [suction] *couch* rolls for receiving and conducting away said sheet.

*24. A paper machine of the character described comprising a pair of breast rolls, frame means supporting said breast rolls in closely spaced relation in a horizontal plane to define a vertically extending nip therebetween, a pair of couch rolls associated with said breast rolls respectively and supported on said frame means in generally vertically spaced relation below said breast rolls, a pair of separate forming webs trained around associated said breast and couch rolls for downward travel from said breast rolls to said couch rolls, means forming a headbox supported on said frame means above said breast rolls for delivering stock downwardly to said nip for downward flow between said forming webs, said couch rolls being positioned in more closely horizontally spaced relation than said breast rolls and in predetermined aligned relation with said breast rolls such that said webs converge downwardly at substantially equal angles to the vertical to cause the water in the stock to drain outwardly from the space between said webs at substantially equal rates and thereby to effect formation in said space of a sheet having outer surface layers on both sides thereof which are substantially identical in composition and texture, means for effecting removal of the drained water from within the loop of each said web, means for causing said webs to loop said couch rolls respectively and thereby to diverge from each other, and means for receiving and conducting the sheet away from said couch rolls.*

*25. A paper machine of the character described comprising a pair of breast rolls, frame means supporting said breast rolls in closely spaced relation in a horizontal plane to define a vertically extending nip therebetween, a pair of couch rolls associated with said breast rolls respectively and supported on said frame means in generally vertically spaced relation below said breast rolls, a pair of separate forming webs trained around associated said breast and couch rolls for downward travel from said breast rolls to said couch rolls, means forming a headbox supported on said frame means above said breast rolls for delivering stock downwardly to said nip for downward flow between said forming webs, said couch rolls being positioned in more closely horizontally spaced relation than said breast rolls and in predetermined aligned relation with said breast rolls such that said webs converge downwardly at substantially equal angles to the vertical to cause the water in the stock to drain outwardly through said webs into said chambers at substantially equal rates and thereby to effect formation of a sheet between said webs having outer surface layers on both sides thereof which are substantially identical in composition and texture, means for effecting removal of the drained water from within the loop of each said web, means for causing said webs to loop said couch rolls respectively and thereby to diverge from each other, and means for causing the sheet to remain on a predetermined one of said webs around a portion of the associated said couch roll and thereby to separate from the other said web.*

*26. A paper machine of the character described com-*

*prising a pair of breast rolls, frame means supporting said breast rolls in closely spaced relation in a horizontal plane to define a vertically extending nip therebetween, a pair of couch rolls associated with said breast rolls respectively and supported on said frame means in generally vertically spaced relation below said breast rolls, a pair of separate forming webs trained around associated said breast and couch rolls for downward travel from said breast rolls to said couch rolls, means forming a headbox supported on said frame means above said breast rolls for delivering stock downwardly to said nip for downward flow between and forming webs, said couch rolls being positioned in more closely horizontally spaced relation than said breast rolls and in predetermined aligned relation with said breast rolls such that said webs converge downwardly at substantially equal angles to the vertical to cause the water in the stock to drain outwardly from the space between said webs at substantially equal rates and thereby to effect formation in said space of a sheet having outer surface layers on both sides thereof which are substantially identical in composition and texture, means for effecting removal of the drained water from within the lop of each said web, means for causing said webs to loop said couch rolls respectively and thereby to diverge from each other, a transfer roll below one of said couch rolls, a felt looping said transfer roll, said one couch roll having a suction box therein arranged to hold the sheet on the associated said web as said webs diverge, and means guiding said felt into engagement with the sheet to remove the same from said associated web.*

*27. A paper machine of the character described comprising a pair of breast rolls, frame means supporting said breast rolls in closely spaced relation in a horizontal plane to define a vertically extending nip therebetween, a pair of couch rolls associated with said breast rolls respectively and supported on said frame means in generally vertically spaced relation below said breast rolls, a pair of separate forming webs trained around associated said breast and couch rolls for downward travel from said breast rolls to said couch rolls, means forming a headbox supported on said frame means above said breast rolls for delivering stock downwardly to said nip for downward flow between said forming webs, means for preventing entrainment of air with said webs and stock into said nip of said breast rolls, said couch rolls being positioned in more closely horizontally spaced relation than said breast rolls and in predetermined aligned relation with said breast rolls such that said webs converge downwardly at substantially equal angles to the vertical to cause the water in the stock to drain outwardly from the space between said webs at substantially equal rates and thereby to effect formation in said space of a sheet having outer surface layers on both sides thereof which are substantially identical in composition and texture, means for effecting removal of the drained water from within the loop of each said web, means forming seals between the edges of the downwardly traveling portions of said webs preventing lateral flow of liquid from said space and entry of air to said space, means for causing said webs to loop said couch rolls respectively and thereby to diverage from each other, and means for receiving and conducting the sheet away from said couch rolls.*

*28. A paper machine of the character described comprising a pair of breast rolls, frame means supporting said breast rolls in closely spaced relation in a horizontal plane to define a vertically extending nip therebetween, a pair of couch rolls associated with said breast rolls respectively and supported on said frame means in generally vertically spaced relation below said breast rolls, a pair of separate forming webs trained around associated said breast and couch rolls for downward travel from said breast rolls to said couch rolls, means forming chambers each having one side thereof defined by the downwardly traveling portion of one of said webs, means forming a headbox supported on said frame means above said breast rolls for delivering stock downwardly to said nip for downward flow between said forming webs, means forming seals between said chambers preventing lateral flow of water from the space between said webs and entry of air to said space, said couch rolls being positioned in more closely horizontally spaced relation than said breast rolls and in predetermined aligned relation with said breast rolls such that said webs converge downwardly at substantially equal angles to the vertical to cause the water in the stock to drain outwardly through said webs into said chambers at substantially equal rates and thereby to effect formation of a sheet between said webs having outer surface layers on both sides thereof which are substantially identical in composition and texture, means for effecting removal of the drained water from within the loop of each said web, means for causing said webs to loop said couch rolls respectively and thereby to diverge from each other, and means for causing the sheet to remain on a predetermined one of said webs around a portion of the associated said couch roll and thereby to separate from the other said web.*

*29. A paper machine of the character described comprising a pair of breast rolls, frame means supporting said breast rolls in closely spaced relation in a horizontal plane to define a vertically extending nip therebetween, a pair of couch rolls associated with said breast rolls respectively and supported on said frame means in generally vertically spaced relation below said breast rolls, a pair of separate forming webs trained around associated said breast and couch rolls for downward travel from said breast rolls to said couch rolls, a headbox, means supporting said headbox above said breast rolls in position to deliver stock downwardly to said nip for downward flow between said forming webs, said couch rolls being positioned in more closely horizontally spaced relation than said breast rolls and in predetermined aligned relation with said breast rolls such that said webs converge downwardly at substantially equal angles to the vertical to cause the water in the stock to drain outwardly from the space between said webs at substantially equal rates and thereby to effect formation in said space of a sheet having outer surface layers on both sides thereof which are substantially identical in composition and texture, a plurality of deflector members positioned in vertically spaced relation within the loop of each said web and in closely spaced and downwardly diverging relation with the adjacent said web to deflect water flowing through said web downwardly and away from said web, means for effecting removal of such deflected water from within the loop of each said web, means for causing said webs to loop said couch rolls respectively and thereby to diverge from each other, and means for receiving and conducting the sheet away from said couch rolls.*

References Cited in the file of this patent or the original patent

UNITED STATES PATENTS

| | | |
|---|---|---|
| 57,192 | Russell | Aug. 14, 1866 |
| 214,250 | Gregg | Apr. 15, 1879 |
| 1,500,208 | Shaw | July 8, 1924 |
| 1,661,678 | Price | Mar. 6, 1928 |
| 1,718,574 | Millspaugh | June 25, 1929 |
| 1,782,215 | Sheperd | Nov. 18, 1930 |
| 1,817,594 | Wagner et al. | Aug. 4, 1931 |
| 1,875,075 | Mason | Aug. 30, 1932 |
| 2,167,440 | Mason | July 25, 1939 |
| 2,554,968 | Thompson | May 29, 1951 |
| 2,823,593 | Holden | Feb. 18, 1958 |
| 2,881,669 | Thomas et al. | Apr. 14, 1959 |
| 2,977,277 | Kelly | Mar. 28, 1961 |

FOREIGN PATENTS

| | | |
|---|---|---|
| 2,477 | Great Britain | July 9, 1875 |